United States Patent Office 3,301,874
Patented Jan. 31, 1967

3,301,874
THIENOCYCLOPENTANONE ANTIBACTERIAL AGENTS
Joseph Sam, Oxford, Miss. 38655
No Drawing. Filed Dec. 26, 1963, Ser. No. 333,667
10 Claims. (Cl. 260—332.3)

This invention relates to novel compounds. More particularly, this invention relates to novel compounds having antibacterial properties.

There is provided according to the present invention compounds of the formulae (I) 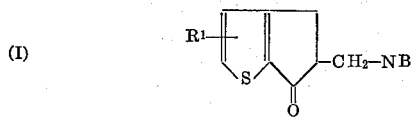

and (II) 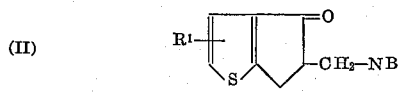

wherein $R^1$ is a member selected from the group consisting of hydrogen, chloro, bromo, fluoro, iodo, trifluoromethyl, nitro, (lower)alkyl, allyl, and radicals of the formula

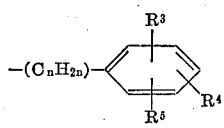

wherein $n$ is a whole integer from 0 to 3 inclusive, $R^3$, $R^4$ and $R^5$ are each a member selected from the group consisting of hydrogen, chloro, bromo, iodo, fluoro, trifluoromethyl, nitro, (lower)alkyl, (lower)alkoxy, (lower)alkylthio, allyl and di(lower)alkylamino, and wherein NB is a primary or secondary amino radical; and the pharmaceutically acceptable nontoxic acid addition salts thereof.

The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Similarly, where the term "(lower)" is used as part of the description of another group, e.g., "(lower)alkoxy," it refers to the alkyl portion of such group which is therefore as described above in connection with "(lower)alkyl."

The term "primary amino radical" as used herein refers to a radical obtained by removing one hydrogen atom attached to the nitrogen atom of a primary amine and thus comprises radicals of the formula —$NHR^2$ wherein $R^2$ is selected from the group consisting of hydrogen, (lower)alkyl, cycloalkyl having from five to seven carbon atoms inclusive, and radicals of the formula

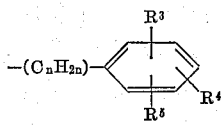

wherein $n$ is a whole integer from 0 to 3 inclusive, and $R^3$, $R^4$ and $R^5$ each represent a member selected from the group consisting of hydrogen, (lower)alkyl, (lower)alkoxy, allyl, chloro, bromo, fluoro, iodo, nitro, trifluoromethyl, di(lower)alkylamino and (lower)alkylthio. The term "primary amino radicals" therefore includes for example, such radicals as amino, methylamino, ethylamino, propylamino, isopropylamino, hexylamino, cyclopentylamino, cyclohexylamino, cycloheptylamino, phenylamino, benzylamino and the like.

The term "secondary amino radical" refers to a radical obtained by removing one hydrogen atom attached to the nitrogen atom of a secondary amine, and thus comprises radicals from the group consisting of morpholino, (lower)alkylmorpholino, di(lower)alkylmorpholino, piperidino, (lower)alkylpiperidino, di(lower)alkylpiperidino, pyrrolidino, (lower)alkylpyrrolidino, di(lower)alkylpyrrolidino, N-lower)alkylpiperazino, N-(lower)alkyl-(lower)alkylpiperazino, N-(lower)alkyl-di(lower)alkylpiperazino, and radicals of the formula

wherein $R^6$ and $R^7$ are selected from the group consisting of (lower)alkyl, cycloalkyl having from five to seven carbon atoms inclusive and radicals of the formula

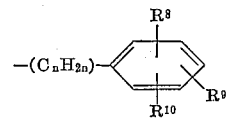

wherein $n$ is a whole integer from 0 to 3 inclusive, and $R^8$, $R^9$ and $R^{10}$ each represent a member selected from the group consisting of hydrogen, (lower)alkyl, (lower)alkoxy, allyl, chloro, bromo, fluoro, iodo, nitro, trifluoromethyl, di(lower)alkylamino and (lower)alkylthio. The term "secondary amino radicals" therefore includes for example, such radicals as dimethylamino, diethylamino, dipropylamino, di-n-butylamino, diisoamylamino, dibenzylamino, diphenylamino, dicyclopentylamino, dicyclohexylamino, dicycloheptylamino, methylanilino, methylethylamino, α-, β- and γ-pipecolino, morpholino, 2,6-dimethylmorpholino, N-methylpiperazino, N-methylbenzylamino, pyrrolidino, 2,6-dimethylpiperidino, N-methyl-n-butylamino, N-ethylcyclohexylamino and the like.

The pharmaceutically acceptable nontoxic salts of the foregoing bases include the organic and inorganic acid addition salts prepared by simple addition of one equivalent of acid to the base. These salts include those prepared from acids such as hydrochloric, sulfuric, sulfamic, tartaric, hydrobromic, hydroiodic, glycolic, citric, maleic, phosphoric, succinic, acetic and the like.

In view of the cumbersome chemical names for the compounds of this invention, the name "thiaindan" has been adopted for the following structure:

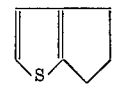

The keto substituted thiaindans having the following formulae and chemical names:

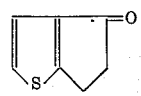

4,5-dihydro-6H-cyclopenta[b]thiophene-4-one;

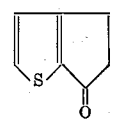

4,5-dihydro-6H-cyclopenta[b]thiophene-6-one; have been designated thiaindan-4-one and thiaindan-6-one, respectively.

The compounds of this invention are antibacterial agents exhibiting activity against many bacteria, e.g., *Staphylococcus aureus* Smith. They are of value as nutritional supplements in animal feeds, as agents for the treatment of mastitis in cattle and as therapeutic agents in poultry and animals including man. In addition, the compounds are useful in separating and classifying mixtures of microorganisms for biological research and for the removal of microorganisms from laboratory equipment, sick rooms, animal and poultry-growing enclosures, surgical instruments and the like. In general, solutions containing about 10% by weight of the compounds of the present invention are adequate for the removal of microorganisms.

The compounds of the present invention can be compounded and formulated into pharmaceutical preparations for oral, parenteral or topical administration with organic or inorganic solid materials or liquids that are pharmaceutically acceptable carriers. The compositions may take the form of tablets, effervescent tablets, powder, granules, capsules (both hard and soft shell capsules), suspensions, solutions, emulsions, injectable solutions and suspensions, and the like. Such compositions are considered within the scope of this invention.

A preferred group of compounds of Formula I are those of the formula

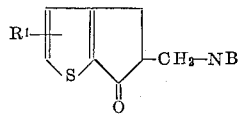

wherein $R^1$ and NB are as represented above. A more preferred group of compounds are those of the formula

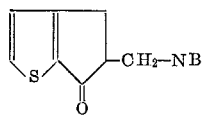

wherein NB is as represented above. A still more preferred group of compounds are those of the formula

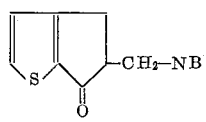

wherein NB is a secondary amino radical.

The preparation of the thiaindan-6-one compounds of the present invention involves first the reaction of a compound of the formula:

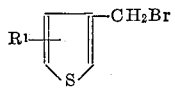

wherein $R^1$ is as represented above with a diethyl malonate to produce a compound of the formula:

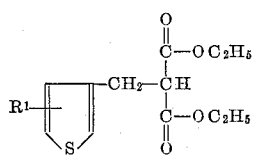

which is hydrolyzed and then decarboxylated by heating to produce substituted β-(3-thienyl)propanoic acids of the formula:

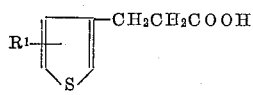

The intramolecular acylation of the substituted β-(3-thienyl)propanoic acids can then be conducted, as illustrated by Example 1, using either polyphosphoric acid at an elevated temperature of about 130° C. or liquid hydrogen fluoride as a dehydrating agent, to produce the corresponding thiaindan-6-one of the formula

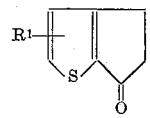

In the synthesis of the aminomethyl thiaindan-6-ones, a thiaindan-6-one is reacted, as illustrated by Example 1 below, with paraformaldehyde and a primary or secondary amine of the formula:

HNB wherein NB is as represented above, to produce the compounds of the formula:

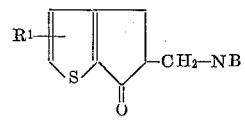

wherein NB has the meaning set forth above.

Thus when thiaindan-6-one is reacted with paraformaldehyde and dimethylamine, the compound represented by the following formula

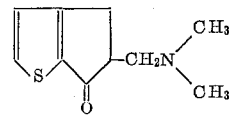

5-dimethylaminomethylthiaindan-6-one, is produced.

Thiophene and substituted thiophenes which are used as starting materials in the synthesis of the compounds of the present invention are commercially available or can be prepared according to methods described in the scientific literature. Many of these compounds are described in Chemistry of Carbon Compounds, vol. IV, chapter III, pp. 203–243 (1957), edited by E. H. Rodd, and published by Elsevier Publishing Company of New York, New York, and in Thiophene and Its Derivatives, by H. D. Hartough, published in 1952 by Interscience Publishers Inc., New York, New York.

The thiaindan-4-one compounds of the present invention are conveniently prepared by first reducing an acrylic acid of the formula

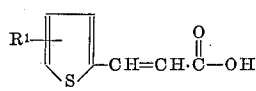

wherein $R^1$ is as represented above with a 9.6% lead-sodium alloy in dilute sodium hydroxide to produce substituted β-(2-thienyl)propanoic acids of the formula

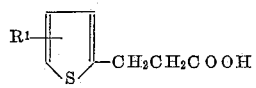

wherein $R^1$ is as represented above.

An alternate procedure for preparing the substituted β-(2-thienyl)propanoic acids is by hydrogenation of the acrylic acid in the presence of a 10% palladium-carbon catalyst.

The substituted β-(2-thienyl)propanoic acids are converted to the corresponding thiaindan-4-ones of the formula

wherein $R^1$ is as represented above and then to the aminoethyl thiaindan-4-ones of the formula

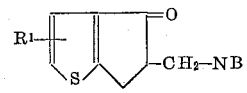

wherein $R^1$ and NB are as represented above by the methods previously described for the preparation of thiaindan-6-ones and aminomethyl thiaindan-6-ones.

The acrylic acids which are used as starting materials are also commercially available or can be prepared according to methods described in the scientific literature.

The following examples are intended to illustrate the invention described herein without unduly restricting it.

EXAMPLE 1

(A) *Preparation of β-(3-thienyl)propanoic acid*

To a solution of 480 g. (3.0 mole) of diethyl malonate in ethanolic sodium ethoxide, prepared from 66.7 g. (2.9 g.-at.) of sodium and 1000 ml. of ethanol, is added through a dropping funnel 520 g. (2.9 mole) of 3-bromomethylthiophene and the mixture heated at reflux for 5 hours. A solution of 600 g. of potassium hydroxide in 800 ml. of water is added and the mixture refluxed for 24 hours. The solution is concentrated to 800 ml. in vacuo, treated with 500 ml. of water, cooled in an ice bath, made acid with concentrated hydrochloric acid, and extracted with ether. The solid left after evaporation of the ether is distilled to give 287 g. (42%) of product, B.P. 120–125°/5 mm., M.P. 61–62° C.

(B) *Preparation of thiaindan-6-one (4,5-dihydro-6H-cyclopenta[b]thiophene-6-one)*

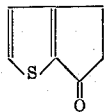

Method I: Polyphosphoric acid (300 g.) in a 400 ml. beaker, is heated to 80° C. in an oil bath. A solution of β-(3-thienyl)propanoic acid (31.2 g., 0.2 mole) in 50 ml. chlorobenzene is added dropwise, with vigorous stirring to the polyphosphoric acid at such a rate that the temperature remains above 75° C. After the addition is completed, the mixture is stirred for five minutes and then poured into 700 ml. ice water with stirring. The aqueous acid is extracted with two 300 ml. portions of ethyl ether, the ether solution collected, washed with 10% aqueous sodium carbonate solution and dried over anhydrous sodium sulfate. The ether is then removed by evaporation under reduced pressure and the product distilled at 110° C. at 7 mm. Hg. The resulting product is found to weigh 2.9 g., to melt at 90–91° C. and to have the following elemental analysis: Calculated for $C_7H_6OS$: C, 60.9%; H, 4.3%. Found: C, 61.1%; H, 4.4%.

Method II: Four hundred grams of liquid hydrogen fluoride is added to β-(3-thienyl)propanoic acid (50 g., 0.32 mole) in a copper retort and the mixture allowed to stand for overnight, after which the mixture is poured into a copper beaker and the hydrogen fluoride evaporated. The brown material remaining in the beaker is extracted with ethyl ether and the resulting extract washed with water and 10% aqueous solution of sodium carbonate until the washing becomes alkaline. The ether is then evaporated and the resulting product, thiaindan-6-one, recrystallized from ethanol, collected by filtration, dried, and found to weigh 19.4 g. (43.9% theoretical yield). The infrared spectrum of the product is identical with that of the product of Method I above, and shows a strong carbonyl absorption band at 1740 cm.$^{-1}$.

(C) *Preparation of 5-dimethylaminomethyl thiaindan-6-one hydrochloride*

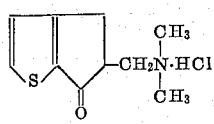

A solution containing dimethylamine hydrochloride (3.61 g., 0.05 mole), paraformaldehyde (1.5 g., 0.05 mole), concentrated hydrochloric acid (2 drops), benzene (8 ml.), and nitrobenzene (8 ml.), is refluxed for 20 minutes. After refluxing, thiaindan-6-one (6.9 g., 0.05 mole) is added and reflux continued for an additional 30 minutes. During the last 12 minutes of reflux, the water is distilled off and the resulting solution cooled. The precipitate is collected by filtration and recrystallized from ethyl alcohol. The fine, white crystallized product, 5-dimethylaminomethyl thiaindan-6-one hydrochloride is found to weigh 9.3 g. (80% theoretical yield), to have a melting point of 178–179° C., and to have the following elemental analysis: Calculated for $C_{10}H_{14}ClNOS$: C, 51.8%; H, 6.0%; N, 6.0%; S, 13.9%; Cl, 15.3%. Found: C, 52.0%; H, 5.9%; N, 6.1%; S, 13.9%; Cl, 15.2%.

The product is found to inhibit *Staphylococcus aureus* Smith at a concentration of 6.25 mcg./ml.

EXAMPLE 2

In the procedure of Example 1, the dimethylamine hydrochloride is replaced by 0.05 mole of ammonia,
methylamine,
ethylamine,
propylamine,
butylamine,
octylamine,
cyclopentylamine,
cyclohexylamine,
phenylamine,
3-chlorophenylamine,
2-methylphenylamine,
3,4-dimethoxyphenylamine,
2-iodophenylamine,
4-trifluoromethylphenylamine,
2-bromophenylamine,
2,3,4-trichlorophenylamine,
4-fluorophenylamine,
4-allylphenylamine,
2-nitrophenylamine,
2,3-dimethylphenylamine,
2,4-dichlorophenylamine,
2-methylthiophenylamine,
4-diethylaminophenylamine,
benzylamine,
2-chlorobenzylamine,
2,4-dibromophenylamine,
2,3-dichlorobenzylamine,
2-methoxybenzylamine and
phenethylamine, respectively, to produce the following free bases, 5-aminomethylthiaindan-6-one,
5-methylaminomethylthiaindan-6-one,
5-ethylaminomethylthiaindan-6-one,
5-propylaminomethylthiaindan-6-one,
5-butylaminomethylthiaindan-6-one,
5-octylaminomethylthiaindan-6-one,
5-cyclopentylaminomethylthiaindan-6-one,
5-cyclohexylaminomethylthiaindan-6-one,
5-phenylaminomethylthiaindan-6-one,
5-(3-chlorophenylaminomethyl)thiaindan-6-one,
5-(2-methylphenylaminomethyl)thiaindan-6-one,
5-(3,4-dimethoxyphenylaminomethyl)thiaindan-6-one,
5-(2-iodophenylaminomethyl)thiaindan-6-one,
5-(4-trifluoromethylphenylaminomethyl)thiaindan-6-one,
5-(2-bromophenylaminomethyl)thiaindan-6-one,
5-(2,3,4-trichlorophenylaminomethyl)thiaindan-6-one,
5-(4-fluorophenylaminomethyl)thiaindan-6-one,
5-(4-allylphenylaminomethyl)thiaindan-6-one,
5-(2-nitrophenylaminomethyl)thiaindan-6-one,
5-(2,3-dimethylphenylaminomethyl)thiaindan-6-one,
5-(2,4-dichlorophenylaminomethyl)thiaindan-6-one,
5-(2-methylthiophenylaminomethyl)thiaindan-6-one,
5-(4-diethylaminophenylaminomethyl)thiaindan-6-one,
5-benzylaminomethylthiaindan-6-one, 5-(2-chlorobenzylaminomethyl)thiaindan-6-one,
5-(2,4-dibromophenylaminomethyl)thiaindan-6-one,
5-(2,3-dichlorobenzylaminomethyl)thiaindan-6-one,
5-(2-methoxybenzylaminomethyl)thiaindan-6-one and
5-phenethylaminomethylthiaindan-6-one, respectively.

EXAMPLE 3

In the procedure of Example 1, the dimethylamine hydrochloride is replaced by 0.05 mole of diethylamine,
diheptylamine,
dicyclohexylamine,
N-methylethylamine,
diphenylamine,
N-methylbenzylamine,
N-ethyl-4-methylphenylamine,
N-methyl-3-chlorophenylamine,
dipropylamine,
N-ethylpiperazine,
morpholine,
N-methyl-3,4-dimethoxyphenylamine,
piperidine,
N-methyl-2,6-diethylpiperazine,
pyrrolidine,
pipecoline,
2-methylmorpholine,
di-2,3,4-trichlorophenylamine,
N-ethyl-2,4-dimethoxyphenylamine,
N-methyl-4-allylphenylamine,
dibenzylamine,
N-methyl-2-bromophenylamine,
N-methyl-4-trifluoromethylphenylamine, and
di-3-methylthiophenylamine, respectively, to produce the following free bases, 5-diethylaminomethylthiaindan-6-one,
5-diheptylaminomethylthiaindan-6-one,
5-dicyclohexylaminomethylthiaindan-6-one,
5-(N-methylethylaminomethyl)thiaindan-6-one,
5-diphenylaminomethylthiaindan-6-one,
5-(N-methylbenzylaminomethyl)thiaindan-6-one,
5-(N-ethyl-4-methylphenylaminomethyl)thiaindan-6-one,
5-(N-methyl-3-chlorophenylaminomethyl)thiaindan-6-one,
5-dipropylaminomethylthiaindan-6-one,
5-(N-ethylpiperazinomethyl)thiaindan-6-one,
5-morpholinomethylthiaindan-6-one,
5-(N-methyl-3,4-dimethoxyphenylaminomethyl)-thiaindan-6-one,
5-piperidinomethylthiaindan-6-one,
5-(N-methyl-2,6-diethylpiperazinomethyl)thiaindan-6-one,
5-pyrrolidinomethylthiaindan-6-one,
5-pipecolinomethylthiaindan-6-one,
5-(2-methylmorpholinomethyl)thiaindan-6-one,
5-(di-2,3,4-trichlorophenylaminomethyl)thiaindan-6-one,
5-(N-ethyl-2,4-dimethoxyphenylaminomethyl)thiaindan-6-one,
5-(N-methyl-4-allylphenylaminomethyl)thiaindan-6-one,
5-dibenzylaminomethylthiaindan-6-one,
5-(N-methyl-2-bromophenylaminomethyl)thiaindan-6-one,
5-(N-methyl-4-trifluoromethylphenylaminomethyl)-thiaindan-6-one, and
5-(di-3-methylthiophenylaminomethyl)thiaindan-6-one, respectively.

EXAMPLE 4

In the procedure of Example 1, the 3-bromomethylthiophene is replaced by 2.9 mole of 2-bromo-4-bromomethylthiophene,
3-methyl-4-bromomethylthiophene,
2-trifluoromethyl-4-bromomethylthiophene,
2-nitro-4-bromomethylthiophene,
3-chloro-4-bromomethylthiophene,
3-isopropyl-4-bromomethylthiophene,
3-phenyl-4-bromomethylthiophene,
2-fluoro-4-bromomethylthiophene,
3-(2-chlorophenyl)-4-bromomethylthiophene,
3-benzyl-4-bromomethylthiophene,
3-(4-methylbenzyl)-4-bromomethylthiophene,
2-(3,6-dimethylphenyl)-4-bromomethylthiophene,
3-(2,5-dichlorophenyl)-4-bromomethylthiophene,
2-allyl-4-bromomethylthiophene,
2-(4-methoxyphenyl)-4-bromomethylthiophene,
2-(2,3,4-trichlorophenyl)-4-bromomethylthiophene,
3-(2,4,5-trifluorobenzyl)-4-bromomethylthiophene,
2-(2-nitrophenyl)-4-bromomethylthiophene,
3-(2,5-dibromophenyl)-4-bromomethylthiophene,
3-(4-chlorophenyl)-4-bromomethylthiophene,
3-(4-allylphenyl)-4-bromomethylthiophene,
3-(2-dimethylaminophenyl)-4-bromomethylthiophene,
2-(2-fluoro-4-trifluoromethylphenyl)-4-bromomethylthiophene,
3-(4-iodophenyl)-4-bromomethylthiophene,
2-(4-ethylthiobenzyl)-4-bromomethylthiophene, respectively, to produce the hydrochloride salts of the following compounds, 2-bromo-5-dimethylaminomethylthiaindan-6-one,
3-methyl-5-dimethylaminomethylthiaindan-6-one,
2-trifluoromethyl-5-dimethylaminomethylthiaindan-6-one,
2-nitro-5-dimethylaminomethylthiaindan-6-one,
3-chloro-5-dimethylaminomethylthiaindan-6-one,
3-isopropyl-5-dimethylaminomethylthiaindan-6-one,
3-phenyl-5-dimethylaminomethylthiaindan-6-one,
2-fluoro-5-dimethylaminomethylthiaindan-6-one,
3-(2-chlorophenyl)-5-dimethylaminomethylthiaindan-6-one,
3-benzyl-5-dimethylaminomethylthiaindan-6-one,
3-(4-methylbenzyl)-5-dimethylaminomethylthiaindan-6-one,
2-(3,6-dimethylphenyl)-5-dimethylaminomethylthiaindan-6-one,
3-(2,5-dichlorophenyl)-5-dimethylaminomethylthiaindan-6-one,
2-allyl-5-dimethylaminomethylthiaindan-6-one,
2-(4-methoxyphenyl)-5-dimethylaminomethylthiaindan-6-one,
2-(2,3,4-trichlorophenyl)-5-dimethylaminomethylthiaindan-6-one,
3-(2,4,5-trifluorobenzyl)-5-dimethylaminomethylthiaindan-6-one,
2-(2-nitrophenyl)-5-dimethylaminomethylthiaindan-6-one,
3-(2,5-dibromophenyl)-5-dimethylaminomethylthiaindan-6-one,
3-(4-chlorophenyl)-5-dimethylaminomethylthiaindan-6-one,
3-(4-allylphenyl)-5-dimethylaminomethylthiaindan-6-one,
3-(2-dimethylaminophenyl)-5-dimethylaminomethylthiaindan-6-one,
2-(2-fluoro-4-trifluoromethylphenyl)-5-dimethylaminomethylthiaindan-6-one,
3-(4-iodophenyl)-5-dimethylaminomethylthiaindan-6-one, 2-(4-ethylthiobenzyl)-5-dimethylaminomethylthiaindan-6-one, respectively.

EXAMPLE 5

In the procedure of Example 1, 3-bromomethylthiophene and dimethylamine hydrochloride are replaced by 3-ethyl-4-bromomethylthiophene and methylamine,
2-chloro-4-bromomethylthiophene and diethylamine,
3-(3-methylphenyl)-4-bromomethylthiophene and phenylamine,
2-(4-trifluoromethylbenzyl)-4-bromomethylthiophene and cyclohexylamine,
2-methyl-4-bromomethylthiophene and N-methylpiperazine,
3-trifluoromethyl-4-bromomethylthiophene and diphenylamine, and
3-phenyl-4-bromomethylthiophene and N-ethylpropylamine, respectively, to produce the following free bases, 3-ethyl-5-methylaminomethylthiaindan-6-one,
2-chloro-5-diethylaminomethylthiaindan-6-one,
3-(3-methylphenyl)-5-phenylaminomethylthiaindan-6-one,
2-(4-trifluoromethylbenzy)-5-cyclohexylaminomethyl-thiaindan-6-one,
2-methyl-5-(N-methylpiperazinomethyl)thiaindan-6-one,
3-trifluoromethyl-5-diphenylaminomethylthiaindan-6-one and
3-phenyl-5-(N-ethylpropylaminomethyl)thiaindan-6-one, respectively.

EXAMPLE 6

(A) *Preparation of β-(2-thienyl)propanoic acid*

Method I: To a stirred solution of 15.4 g. (0.1 mole) of β-(2-thienyl)acrylic acid in 200 ml. of 10% sodium hydroxide solution is added, over a period of 2 hours, 100 g. of 9.6% lead-sodium alloy. The mixture is filtered and the basic filtrate neutralized with concentrated hydrochloric acid. The precipitate is removed by filtration, air-dried, and recrystallized from petroleum ether (B.P. 30–60° C.) to give 10 g. (64%) of product, M.P. 48–49° C.

Method II: A solution of 15.4 g. (0.1 mole) of β-(2-thienyl)acrylic acid in 200 ml. of methanol is treated with 2 g. of 10% palladium-carbon catalyst and hydrogenated at 42 p.s.i. Hydrogenation is complete at the end of one hour; no further hydrogen uptake occurs during an additional hour. The catalyst is removed by filtration and the solvent is distilled in vacuo leaving 12.6 g. (80%) of product, M.P. 48–49° C. The infrared spectra of samples from Methods I and II are identical. Mixed melting points show no depression.

(B) *Preparation of thiaindan-4-one*

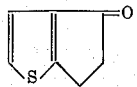

A solution of 15.6 g. (0.1 mole) of β-(2-thienyl)-propanoic acid in 100 ml. of methylene chloride is added with stirring to 200 g. of PPA, preheated to 120° C. When the addition of the organic acid is complete (15 minutes), the reaction mixture is cooled to 95° C. and poured, with stirring, into 200 ml. of ice water. The mixture is extracted with ethyl acetate. The combined extracts are washed with water and sodium bicarbonate solution, and dried over anhydrous sodium sulfate. After distillation of the solvent, the residue is distilled to give 5 g. (36%) of product, B.P. 110° C. (0.2 mm.); M.P. 115–117° C. The infrared spectrum in carbon tetrachloride shows sharp carbonyl absorption at 1740 cm.$^{-1}$. Analysis Calculated for $C_7H_6OS$: C, 61.0%; H, 4.4%. Found: C, 61.4%; H, 4.6%.

(C) *Preparation of 5-dimethylaminomethyl thiaindan-4-one hydrochloride*

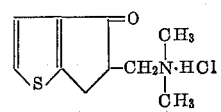

A solution containing dimethylamine hydrochloride (3.61 g., 0.05 mole), paraformaldehyde (1.5 g., 0.05 mole), concentrated hydrochloric acid (2 drops), benzene (8 ml.), and nitrobenzene (8 ml.), is refluxed for 20 minutes. After refluxing, thiaindan-4-one (6.9 g., 0.05 mole) is added and reflux continued for an additional 30 minutes. During the last 12 minutes of reflux, the water is distilled off and the resulting solution cooled. The precipitate is collected by filtration, recrystallized from ethyl alcohol and the product, 5-dimethylaminomethyl thiaindan-4-one hydrochloride, recovered.

EXAMPLE 7

In the procedure of Example 6, the β-(2-thienyl)-acrylic acid is replaced by 0.1 mole of β-[2-(4-methylthienyl)]acrylic acid,
β-[2-(5-chlorothienyl)]acrylic acid,
β-[2-(5-2-trichloromethylphenylthienyl)] acrylic acid,
β-[2-(5-benzylthienyl)]acrylic acid,
β-[2-(4-(4-methoxyphenyl)thienyl)]acrylic acid,
β-[2-(4-(2,5-diethylphenyl)thienyl)]acrylic acid,
β-[2-(4-nitrothienyl)]acrylic acid, respectively, to produce the hydrochloride salts of the following compounds, 3-methyl-5-dimethylaminomethylthiaindan-4-one,
2-chloro-5-dimethylaminomethylthiaindan-4-one,
2-(2-trichloromethylphenyl)-5-dimethylaminomethyl-thiaindan-4-one,
2-benzyl-5-dimethylaminomethylthiaindan-4-one,
3-(4-methoxyphenyl)-5-dimethylaminomethylthiaindan-4-one,
3-(2,5-diethylphenyl)-5-dimethylaminomethylthiaindan-4-one,
3-nitro-5-dimethylaminomethylthiaindan-4-one, respectively.

EXAMPLE 8

In the procedure of Example 6, the dimethylamine hydrochloride is replaced by 0.05 mole of ethylamine,
4-methylphenylamine,
cyclopentylamine,
4-ethylbenzylamine,
2,5-dichlorophenylamine,
dipropylamine,
N-methylpropylamine,
morpholine,
piperidine,
3-ethylthiophenylamine,
diphenylamine,
2,4,5-trimethylphenylamine, and
di-3,6-dibromophenylamine, respectively, to produce the following free bases, 5-ethylaminomethylthiaindan-4-one,
5-(4-methylphenylaminomethyl)thiaindan-4-one,
5-cyclopentylaminomethylthiaindan-4-one,
5-(4-ethylbenzylaminomethyl)thiaindan-4-one,
5-(2,5-dichlorophenylaminomethyl)thiaindan-4-one,
5-dipropylaminomethylthiaindan-4-one,
5-(N-methylpropylaminomethyl)thiaindan-4-one,
5-morpholinomethylthiaindan-4-one,
5-piperidinomethylthiaindan-4-one,
5-(3-ethylthiophenylaminomethyl)thiaindan-4-one,
5-diphenylaminomethylthiaindan-4-one, 5-(2,4,5-trimethylphenylaminomethyl)thiaindan-4-one, and 5-(di-3,6-dibromophenylaminomethyl)thiaindan-4-one, respectively.

EXAMPLE 9

In the procedure of Example 6, β-(2-thienyl)acrylic acid and dimethylamine hydrochloride are replaced by β-[2-(4-trifluoromethylthienyl)]acrylic acid and diethylamine, β-[2-(5-phenylthienyl)]acrylic acid and N-methylpiperazine, β-[2-(4-bromothienyl)]acrylic acid and methylamine, β-[2-(4-(2,5-dimethoxyphenyl)thienyl)]acrylic acid and diphenylamine, β-[2-(4-methylthienyl)]acrylic acid and dihexylamine, and β-[2-(5-chlorothienyl)]acrylic acid and dibenzylamine, respectively, to produce the following free bases, 3-trifluoromethyl-5-diethylaminomethylthiaindan-4-one, 2-phenyl-5-(N-methylpiperazinomethyl)thiaindan-4-one, 3-bromo-5-methylaminomethylthiaindan-4-one, 3-(2,5-dimethoxyphenyl)-5-diphenylaminomethylthiaindan-4-one, 3-methyl-5-dihexylaminomethylthiaindan-4-one, and 2-chloro-5-dibenzylaminomethylthiaindan-4-one, respectively.

Thus, it is apparent from the foregoing that novel compounds useful as antibacterial agents have been discovered. The compounds are conveniently prepared by the methods described herein and exhibit antibacterial activity.

While this invention has been described and exemplified in terms of its preferred embodiment, those skilled in the art will appreciate that modifications can be made without departing from the spirit and scope of this invention.

I claim:

1. A compound selected from the group consisting of compounds of the formulae

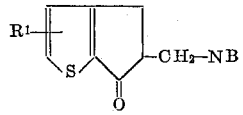

and

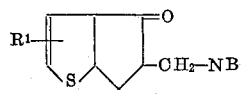

wherein $R^1$ is a member selected from the group consisting of hydrogen, chloro, bromo, fluoro, iodo, trifluoromethyl, nitro, (lower)alkyl, allyl, and radicals of the formula

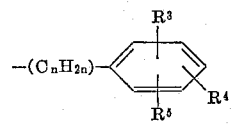

wherein $n$ is a whole integer from 0 to 3 inclusive, $R^3$, $R^4$ and $R^5$ are each a member selected from the group consisting of hydrogen, chloro, bromo, iodo, fluoro, trifluoromethyl, nitro, (lower)alkyl, (lower)alkoxy, (lower)alkylthio, allyl and di(lower)alkylamino, and wherein NB is a primary amino radical having the formula —NHR² wherein R² is a member selected from the group consisting of hydrogen, (lower)alkyl, cycloalkyl having from five to seven carbon atoms inclusive, and radicals of the formula

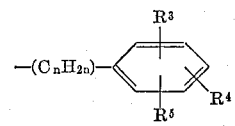

wherein $n$, $R^3$, $R^4$ and $R^5$ are as defined above, or secondary amino radical selected from the group consisting of morpholino, (lower)alkylmorpholino, di(lower)alkylmorpholino, piperidino, (lower)alkylpiperidino, di(lower)alkylpiperidino, pyrrolidino, (lower)alkylpyrrolidino, di(lower)alkylpyrrolidino, N-(lower)alkylpiperazino, N-(lower)alkyl(lower)alkylpiperazino, N - (lower)alkyl-di(lower)alkylpiperazino, and radicals of the formula

wherein $R^6$ and $R^7$ are selected from the group consisting of (lower)alkyl, cycloalkyl, having from five to seven carbon atoms inclusive and radicals of the formula

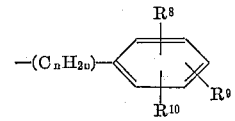

wherein $n$ is a whole integer from 0 to 3 inclusive, and $R^8$, $R^9$ and $R^{10}$ each represent a member selected from the group consisting of hydrogen, (lower) alkyl, (lower)alkoxy, allyl, chloro, bromo, fluoro, iodo, nitro, trifluoromethyl, di(lower)alkylamino and (lower)alkylthio; and the pharmaceutically acceptable nontoxic acid addition salts thereof.

2. A compound selected from the group consisting of compounds of the formula

wherein $R^1$ is a member selected from the group consisting of hydrogen, chloro, bromo, fluoro, iodo, trifluoromethyl, nitro, (lower)alkyl, allyl, and radicals of the formula

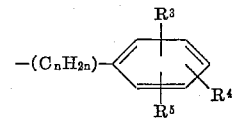

wherein $n$ is a whole integer from 0 to 3 inclusive, $R^3$, $R^4$ and $R^5$ are each a member selected from the group consisting of hydrogen, chloro, bromo, iodo, fluoro, trifluoromethyl, nitro, (lower)alkyl, (lower)alkoxy, (lower)alkylthio, allyl and di(lower)alkylamino, and wherein NB is a primary amino radical having the formula —NHR² wherein R² is a member selected from the group consisting of hydrogen, (lower)alkyl, cycloalkyl having from five to seven carbon atoms inclusive, and radicals of the formula

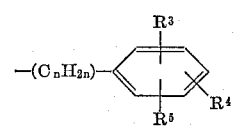

wherein $n$, $R^3$, $R^4$ and $R^5$ are as defined above, or secondary amino radical selected from the group consisting of morpholino, (lower)alkylmorpholino, di(lower)alkylmorpholino, piperidino, (lower)alkylpiperidino, di(lower)alkylpiperidino, pyrrolidino, (lower)alkylpyrrolidino, di(lower)alkylpyrrolidino, N-(lower)alkylpiperazino, N-

(lower)alkyl(lower)alkylpiperazino, N - (lower)alkyl-di(lower)alkylpiperazino, and radicals of the formula

wherein $R^6$ and $R^7$ are selected from the group consisting of (lower)alkyl, cycloalkyl having from five to seven carbon atoms inclusive and radicals of the formula

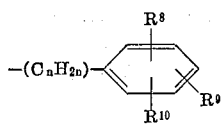

wherein $n$ is a whole integer from 0 to 3 inclusive, and $R^8$, $R^9$ and $R^{10}$ each represent a member selected from the group consisting of hydrogen, (lower)alkyl, (lower)alkoxy, allyl, chloro, bromo, fluoro, iodo, nitro, trifluoromethyl, di(lower)alkylamino and (lower)alkylthio; and the pharmaceutically acceptable nontoxic acid addition salts thereof.

3. A compound selected from the group consisting of compounds of the formula

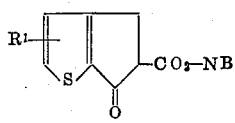

wherein $R^1$ is a member selected from the group consisting of hydrogen, chloro, bromo, fluoro, iodo, trifluoromethyl, nitro, (lower)alkyl, allyl, and radicals of the formula

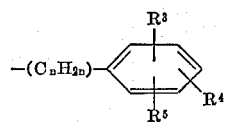

wherein $n$ is a whole integer from 0 to 3 inclusive, $R^3$, $R^4$ and $R^5$ are each a member selected from the group consisting of hydrogen, chloro, bromo, iodo, fluoro, trifluoromethyl, nitro, (lower)alkyl, (lower)alkoxy, (lower)alkylthio, allyl and di(lower)alkylamino, and wherein NB is a primary amino radical having the formula —$NHR^2$ wherein $R^2$ is a member selected from the group consisting of hydrogen, (lower)alkyl, cycloalkyl having from five to seven carbon atoms inclusive, and radicals of the formula

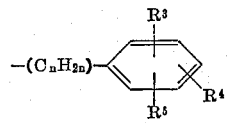

wherein $n$, $R^3$, $R^4$ and $R^5$ are as defined above, or secondary amino radical selected from the group consisting of morpholino, (lower)alkylmorpholino, di(lower)alkylmorpholino, piperidino, (lower)alkylpiperidino, di(lower)alkylpiperidino, pyrrolidino, (lower)alkylpyrrolidino, di(lower)alkylpyrrolidino, N-(lower)alkylpiperazino, N-(lower)alkyl(lower)alkylpiperazino, N - (lower)alkyl-di(lower)alkylpiperazino, and radicals of the formula

wherein $R^6$ and $R^7$ are selected from the group consisting of (lower)alkyl, cycloalkyl having from five to seven carbon atoms inclusive and radicals of the formula

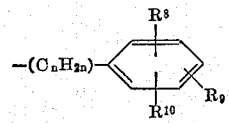

wherein $n$ is a whole integer from 0 to 3 inclusive, and $R^8$, $R^9$ and $R^{10}$ each represent a member selected from the group consisting of hydrogen, (lower)alkyl, (lower)alkoxy, allyl, chloro, bromo, fluoro, iodo, nitro, trifluoromethyl, di(lower)alkylamino and (lower)alkylthio; and the pharmaceutically acceptable nontoxic acid addition salts thereof.

4. A compound selected from the group consisting of compounds of the formula

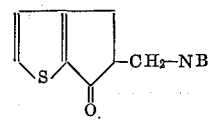

wherein NB is a primary amino radical having the formula —$NHR^2$ wherein $R^2$ is a member selected from the group consisting of hydrogen, (lower)alkyl, cycloalkyl having from five to seven carbon atoms inclusive, and radicals of the formula

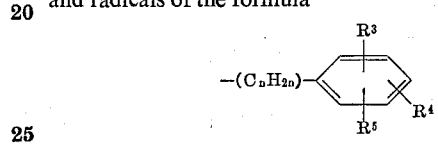

wherein n, $R^3$, $R^4$ and $R^5$ are as defined above, or secondary amino radical selected from the group consisting of morpholino, (lower)alkylmorpholino, di(lower)alkylmorpholino, piperidino, (lower)alkylpiperidino, di(lower)alkylpiperidino, pyrrolidino, (lower)alkylpyrrolidino, di(lower)alkylpyrrolidino, N-(lower)alkylpiperazino, N-(lower)alkyl(lower)alkylpiperazino, N - (lower)alkyl-di(lower)alkylpiperazino, and radicals of the formula

wherein $R^6$ and $R^7$ are selected from the group consisting of (lower)alkyl, cycloalkyl having from five to seven carbon atoms inclusive and radicals of the formula

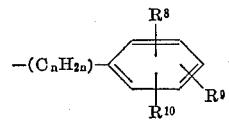

wherein $n$ is a whole integer from 0 to 3 inclusive, and $R^8$, $R^9$ and $R^{10}$ each represent a member selected from the group consisting of hydrogen, (lower)alkyl, (lower)alkoxy, allyl, chloro, bromo, fluoro, iodo, nitro, trifluoromethyl, di(lower)alkylamino and (lower)alkylthio; and the pharmaceutically acceptable nontoxic acid addition salts thereof.

5. A compound selected from the group consisting of compounds of the formula

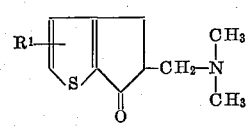

wherein $R^1$ is a member selected from the group consisting of hydrogen, chloro, bromo, fluoro, iodo, trifluoromethyl, nitro, (lower)alkyl, allyl, and radicals of the formula

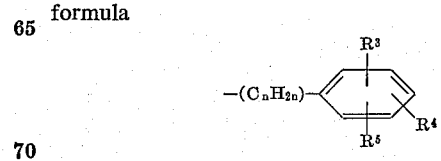

wherein $n$ is a whole integer from 0 to 3 inclusive, $R^3$, $R^4$ and $R^5$ are each a member selected from the group consisting of hydrogen, chloro, bromo, iodo, fluoro, trifluoromethyl, nitro, (lower)alkyl, (lower)alkoxy, (lower)alkylthio, allyl and di(lower)alkylamino; and the pharmaceutically acceptable nontoxic acid addition salts thereof.

6. A compound selected from the group consisting of compounds of the formula

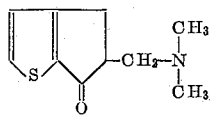

and the pharmaceutically acceptable nontoxic acid addition salts thereof.

7. A compound of the formula

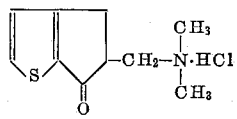

8. A compound selected from the group consisting of compounds of the formula

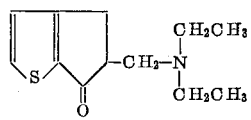

and the pharmaceutically acceptable nontoxic acid addition salts thereof.

9. A compound selected from the group consisting of compounds of the formula

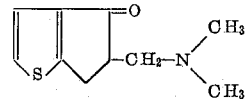

and the pharmaceutically acceptable nontoxic acid addition salts thereof.

10. A compound of the formula

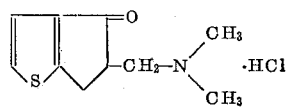

No references cited.

WALTER A. MODANCE, *Primary Examiner.*

JAMES A. PATTEN, *Assistant Examiner.*